Jan. 16, 1934.  R. I. BATES  1,943,911

SHOCK ABSORBER

Filed March 8, 1929

Inventor
Ralph I. Bates

Spencer, Hardman & Fehr
By His Attorneys

Patented Jan. 16, 1934

1,943,911

UNITED STATES PATENT OFFICE 1,943,911

SHOCK ABSORBER

Ralph Irwin Bates, Dayton, Ohio, assignor to Delco Products Corporation, Dayton, Ohio, a corporation of Delaware Application March 8, 1929. Serial No. 345,478

7 Claims. (Cl. 267—8)

This invention relates to improvements in shock absorbers, particularly adapted to cushion the movements of two relatively movable members, for instance, the frame and axle of a vehicle.

It is among the objects of the present invention to provide a shock absorber adapted to permit slight or slow movements of the relatively movable members without resisting said movements, said shock absorber, however, being capable of effectively cushioning the more extended movements of said relatively movable members.

Further objects and advantages of the present invention will be apparent from the following description, reference being had to the accompanying drawing, wherein a preferred embodiment of one form of the present invention is clearly shown.

Figure 1:
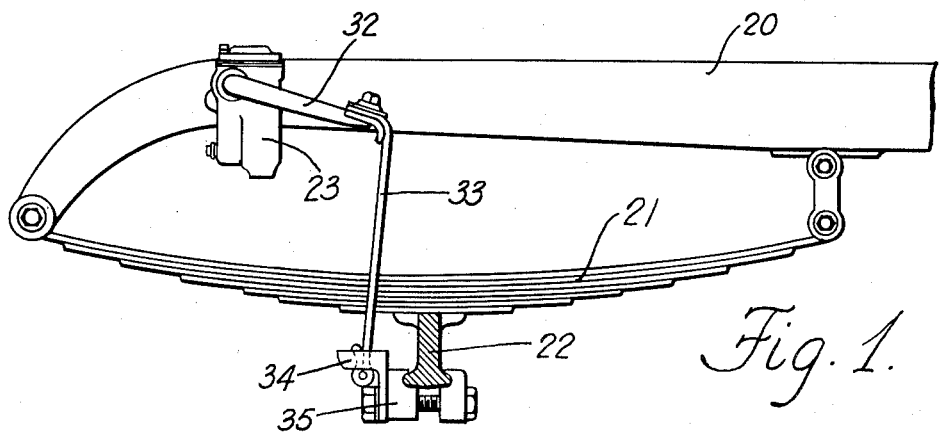
Fig. 1 is a view illustrating the front end of a motor vehicle frame supported on the axle by the usual springs, the shock absorber equipped with the present invention being shown applied thereto.

Referring to the drawing, the numeral 20 designates the frame of the vehicle having springs 21 hingedly attached thereto, which support the frame 20 upon the axle 22.

The shock absorber designated as a whole by the numeral 23, comprises a casing 24, having apertured lugs 25, adapted to receive studs for attaching the shock absorber to the vehicle frame. A partition 27 is provided within the casing 24, said partition dividing the casing into a fluid reservoir 28 and a cylinder 29. The one end of the cylinder communicates with the fluid reservoir 28, the other end of the cylinder is closed by the end wall 30. Casing 24 provides bearings in which is journalled the shaft portion 31 of the shock absorber operating arm 32. The free end of arm 32 has one end of the strap 33 attached thereto, the other end of the strap is anchored to the bracket 34, which is, in turn, secured to the axle 22 by a clamp 35.

Upon the shaft portion 31 extending across the fluid reservoir 28 there is mounted a rocker arm 36 which is securely attached to the shaft by a set screw 37. The free end of the arm 36 has links 38 attached thereto, said links also being secured to a pin 39, which is journalled in an opening in the lug 40 formed on the head of the piston 41. On each side of the lug 40, the piston head has an opening 42 adapted to provide for the transfer of fluid from one side of the piston to the other.

An annular recess in the inner surface of the head of piston 41 has the base plate 43 of the valve seat member 44 seated therein, the base plate being provided with a depending, annular flange 45. The outer and inner surfaces of the annular flange converge, providing a sharp, annular edge, as shown in the Fig. 2. A central opening in the base plate 43 supports the valve pin 46, upon which valve 47 is slidably supported. A spring 48, interposed between valve 47 and an abutment cup 49, attached to the outer end of the valve stem 46, yieldably urges the valve 47 into seating engagement with the aforementioned sharp edge of the annular valve seat flange 45. Apertures 50 are provided in the base plate 43 of valve seat member 44. The valve seat member is maintained in position in the annular recess of the piston head by the spring 52, one end of which rests upon the end wall 30 of the cylinder 29, the other end engaging the valve seat member 44. The spring 52 urges the piston 41 upwardly in the cylinder 29, away from the end wall 30, when the vehicle wheels strike an obstruction in the roadway and springs 21 are flexed toward the frame of the vehicle, so that the strap connection 33 is slacked. As the piston 41 moves upwardly the arm 36 and the shaft 31 move in a counter-clockwise direction, consequently the arm 32 of shaft 31 will be moved clockwise to take up the said slack in the strap connection 33. This movement of the piston 41 away from the end wall 30 of its cylinder 39 will cause the valve mechanism including valve 47 to establish a substantially free flow of fluid from the fluid chamber 28 through openings 42 and 50 into the cylinder 29.

As soon as the spring 21 has reached the limit of its flexure, the tendency thereof will be to return to normal, unflexed position with a sudden, rebounding movement, which, if permitted, would result in uncomfortable jars and jolts being transmitted to the frame 20 of the vehicle. As the spring 21 begins to move away from the frame 20 on its unflexing stroke, the pull exerted upon strap connection 33 will rotate the arm 32 and its shaft 31 in a clockwise direction, thus the rocker arm 36 will push the piston 40 downwardly into its cylinder causing the valve 47 to be shut tightly, and thus exerting pressure upon the fluid within the cylinder 29. This pressure must be relieved by venting the fluid from the cylinder into the fluid reservoir 28.

The partition 27 of the device has a port 60, providing communication between the fluid reservoir 28 and the cylinder 29. The outer wall of the casing 24 has a screw-threaded aperture 61 in coaxial alignment with the port 60. A recessed screw plug 62 is received by the screw-threaded aperture 61, a gasket 63 being provided between the wall of the casing and the screw plug 62 to prevent leakage at this point. The flow of fluid through the port 60 is controlled by a pressure relief valve adapted to establish two paths for the escapement of the fluid from the cylinder 29 into the fluid reservoir 28. The pressure relief valve comprises two valve members, one of which slidably supports the other. The one valve member designated by the numeral 70 is tubular, the one end thereof being closed as at 71, this end of the valve fitting slidably into the recess of the screw plug 62. The other end of the tubular valve member 70 is designated by the numeral 64 and telescopically fits into the port 60, the outer surface thereof being provided with an annular groove 65 which is in communication with the interior of the tubular valve portion 64 through cross passages 66. An outwardly extending annular flange 67 is provided on this valve member, said flange being urged into engagement with the valve seat 68 provided on the partition 27, by a spring 69, which surrounds the valve member 70 and is interposed between the flange 67 and the inner edge of the screw plug 62. The other valve member termed the "plunger valve" 73 is slidably supported within the tubular valve member 70. This plunger valve comprises a cylindrical head portion and a steam portion extending therefrom and being of lesser diameter than said head portion. A spring 76 interposed between the head portion of the plunger valve 73 and the closed end 71 of the tubular valve member 70 urges the plunger valve into engagement with the stop ring 77 which is secured within the tubular portion 64 of the valve 70 in any suitable manner, such as staking or the like. In the head portion of the plunger valve 73 there is provided a recess 74 substantially coaxial of the said plunger valve, said recess opening into the interior of the tubular portion 64 which in turn opens into the port 60. The head portion of the plunger valve 73 has an annular groove 75 in its outer surface which is in communication with the recess 74 through cross passages 85. In the tubular valve member 70 there are provided openings 72 so positioned in the valve member 70 that the annular groove 75 of the plunger valve is normally in alignment with said openings 72 so that normally communication is provided between the fluid chamber 28 and the cylinder 29 through openings 72, annular passage 75 of the plunger valve, cross passages 85 of the said valve, recess 74, tubular member 64 and port 60.

Figure 2:
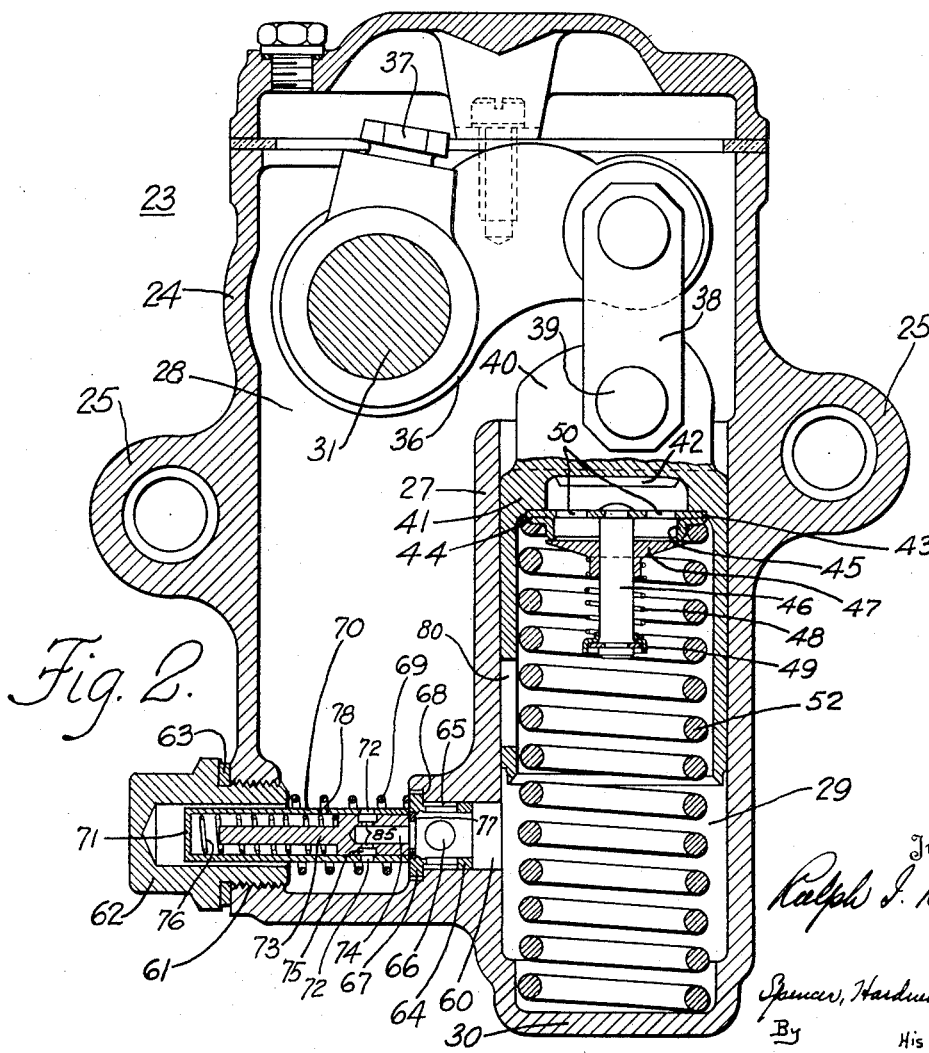
Fig. 2 is a longitudinal sectional view of the shock absorber, clearly showing the improved relief valve.

An orifice 78 in the tubular extension 70 provides communication between the fluid reservoir 28 and the space inside the tubular valve 70 behind the plunger valve 73, so that fluid may enter said space and act as a dash-pot for plunger valve 73 to cushion its movement toward the left, as regards Fig. 2, said movement being substantially stopped by said dash-pot when the plunger valve 73 has been moved sufficiently towards the left to close the orifice 78, at which time the head portion of the valve 73 will have closed ducts 72, and thus, will have broken the communication between the reservoir 28 and the port 60. The skirt of the piston is provided with an opening 80 adapted to maintain communication between the cylinder and port 60 even after the bottom of the skirt has been moved beyond the confines of said port.

Normally, the fluid passage is maintained between the cylinder 29 and the fluid reservoir 28 through the port 60, interior of the tubular portion 64, recess 74 and cross passages 85 and annular groove 75 of the plunger valve 73 and openings 72 in the tubular portion of the valve portion 70. This fluid flow is normally maintained to permit free centering of the piston, that is, slight movements of the axle 22 toward or away from the frame 20 will cause slight reciprocations of the piston 41 in its cylinder 29, thus the slight downward movements of said piston will force fluid from the chamber 29 through the aforedescribed fluid passage and substantially no resistance is offered to such movements of the piston. If, however, the movements of the axle 22 become more extended and are increased in speed, downward movements of the piston will exert a greater pressure upon the plunger valve 73 which, overcoming the effects of spring 76 and of the dash pot behind said plunger valve 73, will move said valve toward the left in the tubular portion 70, thus causing the plunger valve 73 to shut off communication between the openings 72 and the recess 74, and thus, the fluid flow from the cylinder 29 through the tubular portion 64 and the recess 74 of the plunger valve 73 is discontinued. Continued movement of the piston 41 under these conditions will tend to increase the fluid pressure within the cylinder 29, which, after having reached a predetermined degree, will move the valve portion 70, so that its annular flange 67 will be moved from its seat 68, and thus, there is established a flow from cylinder 29 through port 60 into the tubular portion 46, thence through the cross passage 66 of said tubular portion and the space provided between the annular flange 67 and the valve seat 68, the size of this space, between said flange and valve seat, being governed by the degree of fluid pressure upon the relief valve.

From the aforegoing, it may be seen that a substantially low restricted flow of fluid from the cylinder into the fluid chamber is maintained within a certain range of low fluid pressure, said fluid flow being gradually cut off in response to increasing fluid pressures. Another restricted fluid flow from the cylinder 29 into the fluid reservoir 28 is established in response to a predetermined increase in fluid pressure over that mentioned before. More specifically, the plunger valve 73 is normally in open position to establish its flow under normal conditions while the other valve 70 is closed. This said other valve 70 will not open until the plunger valve 73 has been moved by fluid pressure to stop its fluid flow. Neither will the plunger valve 73 move to open until the other valve 70 has been permitted to close.

Control of the shock absorber may be varied by changing the sizes of the openings or cross passages 85 and the openings 72, or by inserting springs 76 of different tensions. The effect of valve 70 may be varied by changing the spring 69.

While the form of embodiment of the present invention as herein disclosed, constitutes a preferred form, it is to be understood that other forms might be adopted, all coming within the scope of the claims which follow.

What is claimed is as follows:

1. A shock absorber comprising, a liquid containing reservoir, a cylinder having a port communicating with said reservoir, a piston reciprocable in the cylinder, a spring actuated relief valve in said port provided with a tubular stem, having apertures to permit fluid to by-pass the valve while seated, in response to slight or slow movements of the piston; a plunger in said tubular stem adapted to close said apertures and discontinue the by-passing of fluid in response to higher pressures caused by increased movements of the piston, said relief valve being movable to open the port and establish a flow therethrough in response to sudden and extended movements of the piston causing substantially higher fluid pressures in the cylinder.

2. A shock absorber comprising, in combination, a casing, a partition within said casing dividing it into a fluid chamber and a cylinder portion; a piston in the cylinder forming a compression chamber therein; a port in the partition connecting the compression and fluid chambers; a relief valve for controlling the flow of fluid through said port, said valve comprising a tubular member having an annular flange yieldably urged against the partition to close the said port, said tubular member having ducts connecting the interior of the tubular member with the fluid reservoir; and a plunger slidably carried within the tubular member and having passages normally aligned with the ducts and opening into the port end of the tubular member; said plunger being operable at a predetermined pressure to shut off communication between the interior of the tubular member and the fluid chamber.

3. A shock absorber comprising, in combination, a casing providing a fluid reservoir and a cylinder, one in communication with the other through a port; a piston adapted to be operated within the cylinder to force fluid, under pressure, from the cylinder, through the port, into the reservoir; and means for controlling said flow of fluid through the port, said means comprising a normally open valve adapted to be closed for completely shutting off its flow of fluid in response to a predetermined fluid pressure in the port, and also comprising a second valve, normally closed, but adapted, in response to a predetermined fluid pressure within the port, to be moved to establish another flow of fluid through said port.

4. A shock absorber comprising, in combination, a casing providing a fluid reservoir and a cylinder, one in communication with the other through a port; a piston adapted to be operated within the cylinder to force fluid, under pressure, from the cylinder, through the port, into the reservoir; and fluid flow control means for said port adapted, in response to predetermined fluid pressures, to vary the flow of fluid through said port, said fluid flow control means comprising a valve normally open for establishing a restricted flow of fluid through the port but adapted, in response to predeterminately increasing fluid pressure, gradually to increase the restriction to the flow of fluid and finally completely cut off said flow, and comprising another valve, normally closed, but which, in response to a predetermined increase in fluid pressure, is adapted to establish another flow of fluid through the port, and only after the first valve has been moved to shut off its flow.

5. A shock absorber comprising, in combination, a casing providing a fluid reservoir and a cylinder, one in communication with the other through a port; a piston adapted to be operated within the cylinder to force fluid, under pressure from the cylinder, through the port, into the reservoir; and a fluid flow controlling mechanism for said port comprising two valves, one normally open the second normally closed, said valves being adapted to be operated successively, the one by predeterminately increasing pressure gradually to restrict and finally completely cut off the flow of fluid established thereby, the second by a predetermined higher fluid pressure to establish its flow of fluid through the port.

6. A shock absorber having a fluid chamber provided with an outlet passage; a valve yieldably urged into said passage and adapted to establish flow from said passage both through and around said valve; a slide valve in said first mentioned valve yieldably urged to permit the fluid flow through said first valve and adapted in response to fluid pressure to be actuated completely to discontinue the said fluid flow through said valve; and a fluid displacement member in said fluid chamber.

7. A shock absorber having a fluid chamber provided with an outlet passage; a fluid flow control mechanism for said passage, said mechanism comprising a tubular valve yieldably urged into said passage and adapted, without movement, to establish a flow of fluid from said passage through the valve and, by its movement to establish another flow from the passage around said valve, and a slide valve within said tubular valve yieldably urged, normally to permit the fluid flow through the tubular valve, but adapted completely to shut off said flow in response to a predetermined fluid pressure in said passage, and a fluid displacement member in the fluid chamber.

RALPH IRWIN BATES.